United States Patent
Kyoda et al.

(10) Patent No.: US 10,389,907 B2
(45) Date of Patent: *Aug. 20, 2019

(54) INFORMATION PROCESSING APPARATUS, INFORMATION PROCESSING METHOD AND PROGRAM FOR DETERMINING SUITABILITY OF PRINTING CONTENT DATA DISPLAYED ON A DISPLAY APPARATUS

(71) Applicant: CANON KABUSHIKI KAISHA, Tokyo (JP)

(72) Inventors: Toshihiko Kyoda, Tokyo (JP); Takahiro Tambe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,176

(22) Filed: Aug. 8, 2017

(65) Prior Publication Data

US 2017/0339300 A1 Nov. 23, 2017

Related U.S. Application Data

(63) Continuation of application No. 15/225,160, filed on Aug. 1, 2016, now Pat. No. 9,848,102, which is a (Continued)

(30) Foreign Application Priority Data

Jul. 24, 2009 (JP) ................................ 2009-173517
Jul. 24, 2009 (JP) ................................ 2009-173518

(51) Int. Cl.
*G06F 3/12* (2006.01)
*H04N 1/327* (2006.01)
(Continued)

(52) U.S. Cl.
CPC ......... *H04N 1/3275* (2013.01); *G06F 3/1204* (2013.01); *G06F 3/1255* (2013.01);
(Continued)

(58) Field of Classification Search
CPC ...... G06F 3/1204; G06F 3/1255; G06F 3/147; G06K 15/025; G06K 15/1806;
(Continued)

(56) References Cited

U.S. PATENT DOCUMENTS 8,610,926 B2 * 12/2013 Kyoda .................. G06F 3/1204
358/1.15
8,873,098 B2 * 10/2014 Kyoda .................. G06F 3/1204
358/1.15
(Continued)

*Primary Examiner* — Gabriel I Garcia
(74) *Attorney, Agent, or Firm* — Canon U.S.A., Inc. IP Division

(57) ABSTRACT

A display apparatus includes a display screen; a display control unit configured to display content on the display screen of the display apparatus; and a detection unit configured to detect approach or contact between a wireless device and the display apparatus. The display control unit performs predetermined display on a basis of information acquired via wireless communication from the wireless device in a case where the approach or contact between the wireless device and the display screen is detected by the detection unit while predetermined content is displayed on the display screen, and does not perform the predetermined display in a case where the approach or contact between the wireless device and the display apparatus is detected by the detection unit while predetermined content is not displayed on the display screen.

9 Claims, 17 Drawing Sheets

Related U.S. Application Data continuation of application No. 14/494,454, filed on Sep. 23, 2014, now Pat. No. 9,443,176, which is a continuation of application No. 14/062,076, filed on Oct. 24, 2013, now Pat. No. 8,873,098, which is a continuation of application No. 12/841,002, filed on Jul. 21, 2010, now Pat. No. 8,610,926.

(51) Int. Cl.

| | | |
|---|---|---|
| *G06K 15/02* | (2006.01) | |
| *H04N 1/00* | (2006.01) | |
| *G06F 3/147* | (2006.01) | |
| *G09G 5/12* | (2006.01) | |

(52) U.S. Cl.
CPC ....... *G06K 15/025* (2013.01); *G06K 15/1806* (2013.01); *G06K 15/1882* (2013.01); *H04N 1/0044* (2013.01); *H04N 1/00477* (2013.01); *H04N 1/32765* (2013.01); *G06F 3/147* (2013.01); *G09G 5/12* (2013.01); *G09G 2370/16* (2013.01)

(58) Field of Classification Search
CPC .. G06K 15/1882; G09G 2370/16; G06G 5/12; H04N 1/3275; H04N 1/004; H04N 1/00477; H04N 1/32765
USPC .......................... 358/1.1–1.18, 402; 399/27
See application file for complete search history.

(56) References Cited

U.S. PATENT DOCUMENTS

| | | | | |
|---|---|---|---|---|
| 9,443,176 | B2* | 9/2016 | Kyoda | G06F 3/1204 |
| 9,848,102 | B2* | 12/2017 | Kyoda | H04N 1/3275 |
| 2007/0195364 | A1* | 8/2007 | Umehara | H04L 41/12 |
| | | | | 358/1.15 |
| 2008/0048998 | A1* | 2/2008 | Yamauchi | G03G 15/5016 |
| | | | | 345/204 |
| 2010/0317332 | A1* | 12/2010 | Bathiche | H04B 1/202 |
| | | | | 455/418 |
| 2010/0323758 | A1* | 12/2010 | Amano | H04N 1/00342 |
| | | | | 455/557 |

* cited by examiner

INFORMATION PROCESSING APPARATUS, INFORMATION PROCESSING METHOD AND PROGRAM FOR DETERMINING SUITABILITY OF PRINTING CONTENT DATA DISPLAYED ON A DISPLAY APPARATUS

CROSS REFERENCE OF RELATED APPLICATIONS

This application is a Continuation of U.S. patent application Ser. No. 15/225,160 filed on Aug. 1, 2016, now U.S. Pat. No. 9,848,102, which is a Continuation of U.S. patent application Ser. No. 14/494,454 filed on Sep. 23, 2014, now U.S. Pat. No. 9,443,176, which is a Continuation of U.S. patent application Ser. No. 14/062,076 filed on Oct. 24, 2013, now U.S. Pat. No. 8,873,098, which is a continuation of U.S. patent application Ser. No. 12/841,002 filed on Jul. 21, 2010, now U.S. Pat. No. 8,610,926, which claims the benefit of Japanese Patent Applications No. 2009-173518 filed Jul. 24, 2009 and No. 2009-173517 filed Jul. 24, 2009, which are hereby incorporated by reference herein in their entirety.

BACKGROUND OF THE INVENTION

Field of the Invention

The present invention relates to a technique for determining suitability of printing content data displayed on a display apparatus.

Description of the Related Art

Conventionally, when printing content displayed on a display, the content is selected, and subsequently a printing apparatus to be used for printing is designated from a menu. Printing apparatuses are represented by names or icons, and association with actual machines is not intuitive.

Accordingly, it may be difficult for a user who is not familiar with the printing apparatuses to designate a printer.

Therefore, Japan Patent Application Laid-Open No. 2006-155194 discusses a method for performing printing operation by preparing an electronic pin for representing a printing apparatus, and by inserting a pin on content being displayed on a display.

In addition, printing apparatuses come in versatile types such as stationary type and portable type, and a situation where a plurality of usable printing apparatuses exist is conceivable. To cope with this situation, Japan Patent Application Laid-Open No. 2005-20051 discusses a processing apparatus, which when a portable terminal is brought close to, for example, a portable printing apparatus, discriminates a model, and determines a appropriate operation according to the model.

However, in order to know whether content being displayed on a display is printable, a user needs to check and determine kind and attribute information of the content, or in practice an actual trial printing needs to be carried out. For this reason, for a person who is not familiar with the operation, the degree of difficulty may be high, and even if the person is skilled in the operation, troublesome operations such as checking of attribute information are needed.

SUMMARY OF THE INVENTION

The present invention is directed to easily determining whether target content data is printable by a printing apparatus a user wants to use.

An image processing apparatus according to the present invention includes a detection unit configured to detect an approach or contact of a printing apparatus relative to a display apparatus, a first acquisition unit configured to acquire information about a print attribute of the printing apparatus detected by the detection unit, a second acquisition unit configured to acquire attributes information about content data to be displayed on the display apparatus, and a determination unit configured to determine suitability of printing the content data in the printing apparatus, based on the information about the print attribute of the printing apparatus and attributes information about the content data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
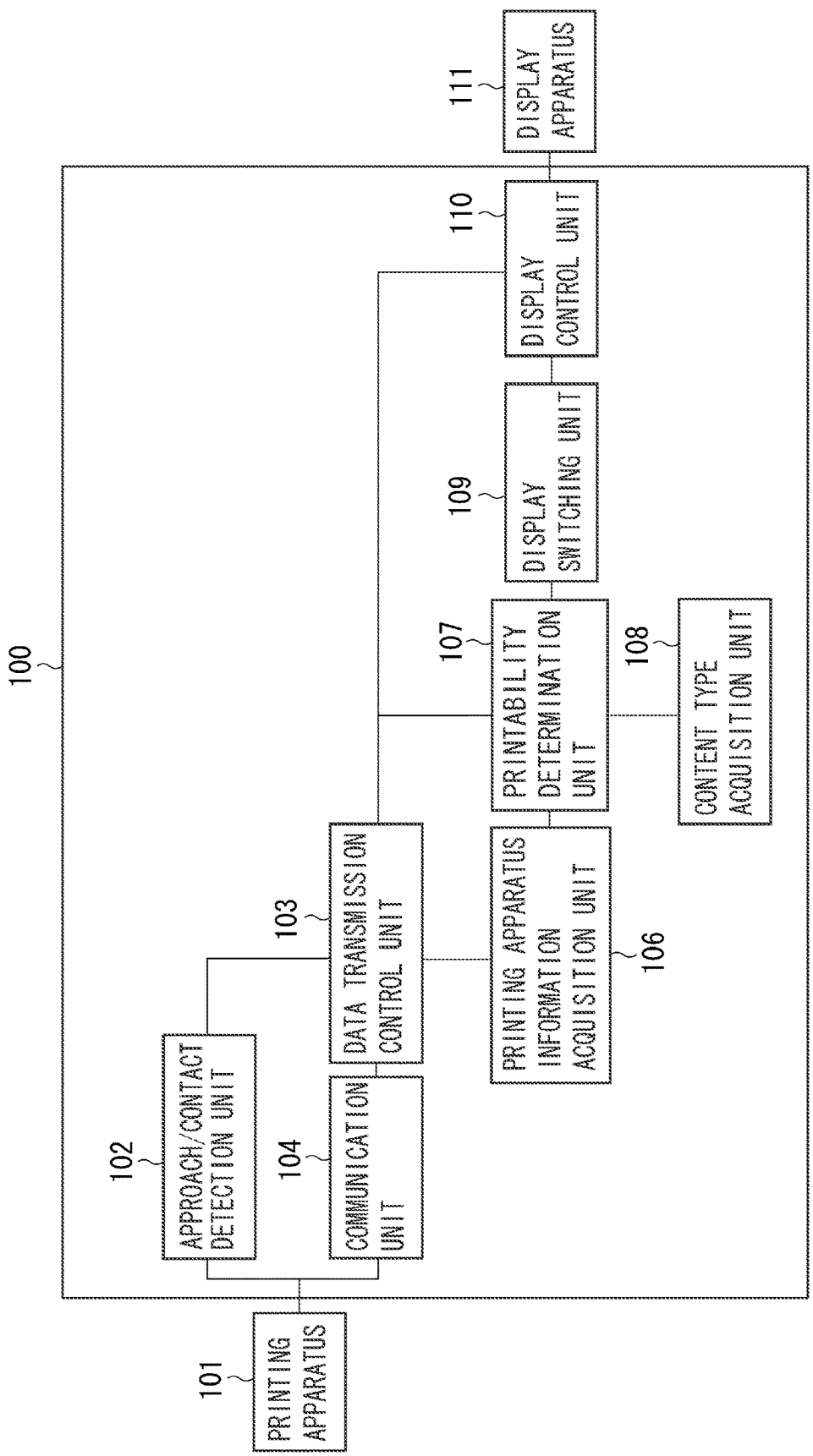
FIG. 1 is a block diagram illustrating a configuration of the principal components of an image display control apparatus according to a first exemplary embodiment of the present invention.

First, a first exemplary embodiment of the present invention will be described. FIG. 1 is a block diagram illustrating a configuration of the principal components of an image display control apparatus 100 according to the first exemplary embodiment of the present invention. The image display control apparatus 100 according to the present exemplary embodiment employs a table type with a flat display surface, but not limited to this type.

In FIG. 1 a printing apparatus 101 is brought close to or into contact with a display apparatus 111 by a user. Hence, the printing apparatus 101 is preferably a portable, compact printer in the present exemplary embodiment.

When the printing apparatus 101 comes close to or into contact with the display apparatus 111, an approach/contact detection unit 102 detects approach or contact of the printing apparatus 101, and notifies a data transmission control unit 103 thereof. The data transmission control unit 103, which has received the notification, connects with the printing apparatus 101 via a communication unit 104. In this case, a connection unit may be wireless communication or wired communication. The approach/contact detection unit 102 is an application example of a detection unit according to the present invention.

A printability determination unit 107 determines printability of content data (hereinafter, abbreviated as content) based on signals from the data transmission control unit 103. A printing apparatus information acquisition unit 106 acquires device information of the printing apparatus 101 via the data transmission control unit 103. The device information is information about print attributes necessary for determining printability of a content in the printability determination unit 107. More specifically, the device information may be device-specific information such as serial number and model number and the like, or may be information about printing functions such as color printing non-printable, high image quality printable. The device information is sent to the printability determination unit 107, which is to be used as information for comparison at the time of determination of printability. A printing apparatus information acquisition unit 106 is an application example of a first acquisition unit according to the present invention. In addition, the printability determination unit 107 is an application example of a determination unit according to the present invention.

The data transmission control unit 103 acquires list information of contents displayed on a screen of the display apparatus 111 from the display control unit 110, and sends them to the printability determination unit 107. The printability determination unit 107 processes in sequence the list of the contents received from the data transmission control unit 103. More specifically, the printability determination unit 107 acquires kinds of the contents and additional attribute information such as printing prohibition attribute from a content type acquisition unit 108 for each of the contents, and compares it with the information about the printing apparatus 101 received from the printing apparatus information acquisition unit 106. The content type acquisition unit 108 acquires attribute information of each of the contents from header-information of the contents or the like. Consequently, it is determined whether target content is printable. The content type acquisition unit 108 is an application example of a second acquisition unit according to the present invention.

In this process, in case of non-printable, not only information that printing cannot be performed, but also reason why printing cannot be performed may be acquired at the same time. Alternatively, from information on kinds of the contents, it may be determined whether they are suitable for printing at the printing apparatus 101 a user wants to use. For example, if the printing apparatus 101 is of a compact type which is suitable for printing of photos, a content like document file may be unsuitable for printing.

In a display switching unit 109, display switching processing between respective contents is performed based on a determination result, and printability of the contents is displayed via the display control unit 110 on the display apparatus 111. Switching the displays of printability of the contents is carried out in such a manner that printable contents may be conspicuously displayed, or the display of non-printable contents may be changed to dark, or the both may be displayed. Also, conspicuous display may be a highlight display, a flashing display, a high brightness display, an enlargement display, or may be a display with shadow which looks like floating. If a printable content underlaps non-printable content, its display position may be moved and the content in question may be displayed on the front. The display switching unit 109 is an application example of the display switching unit according to the present invention.

If a reason for non-printable by the printability determination unit 107 is acquired, the reason for non-printable is additionally displayed in an adjacent region on the screen with respect to the content in question. The reason for non-printable may be displayed with character information, or may be displayed with simplified graphics such as icons.

If suitability of the printing apparatus 101 for printing is determined by the printability determination unit 107, a reason for non-printability may be additionally displayed in the adjacent region on the screen with respect to the content in question. The reason for non-printability may be displayed with character information, or may be displayed with simplified graphics such as icons.

Figure 2:
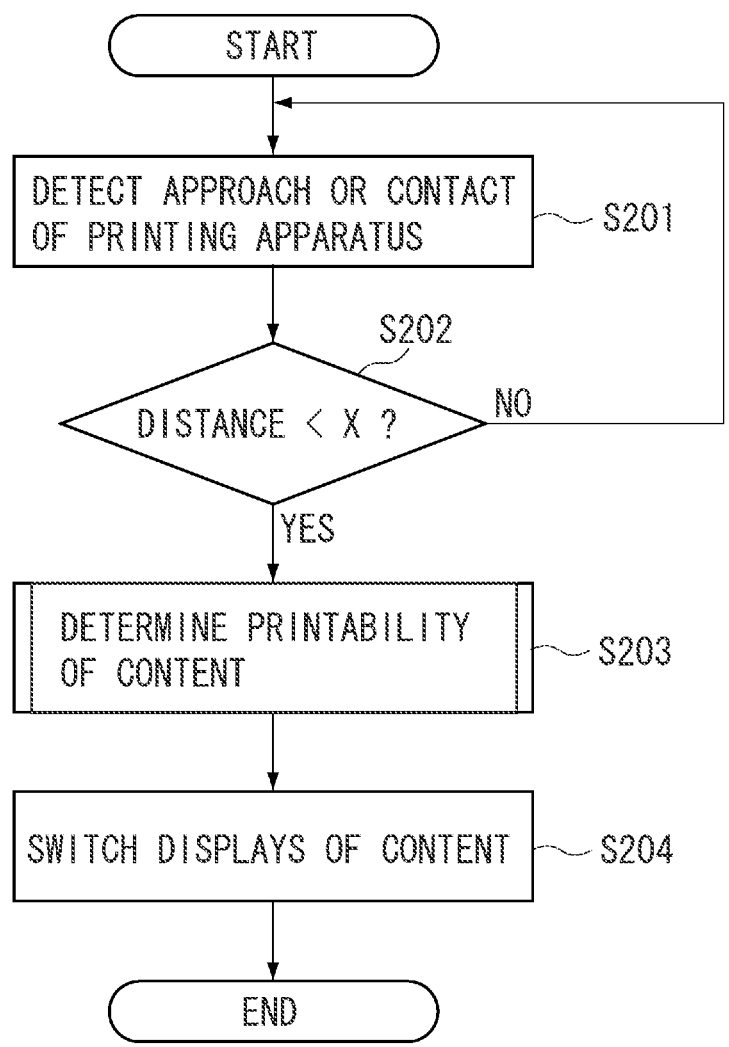
FIG. 2 is a flowchart illustrating a general processing of the image display control apparatus according to the first exemplary embodiment of the present invention.

FIG. 2 is a flowchart illustrating general processing of the image display control apparatus 100 according to the present exemplary embodiment. In steps S201 and S202, the approach/contact detection unit 102 detects approach or contact of the printing apparatus 101. The approach/contact detection unit 102 checks a distance between the printing apparatus 101 and the display apparatus 111 as needed. If the distance is less than "X" (YES in step S202), it is determined that the printing apparatus 101 has come close to or into contact with the display apparatus 111.

If approach or contact of the printing apparatus 101 has been detected, then in step S203, the printability determination unit 107 determines printability of the content displayed on the screen of the display apparatus 111. The details in step S203 will be described below.

In step S204, the display switching unit 109 switches displays of contents in order to distinguish whether the content determined in step S203 is printable. The displays are switched as previously described with reference to the block diagram in FIG. 1.

Figure 3:
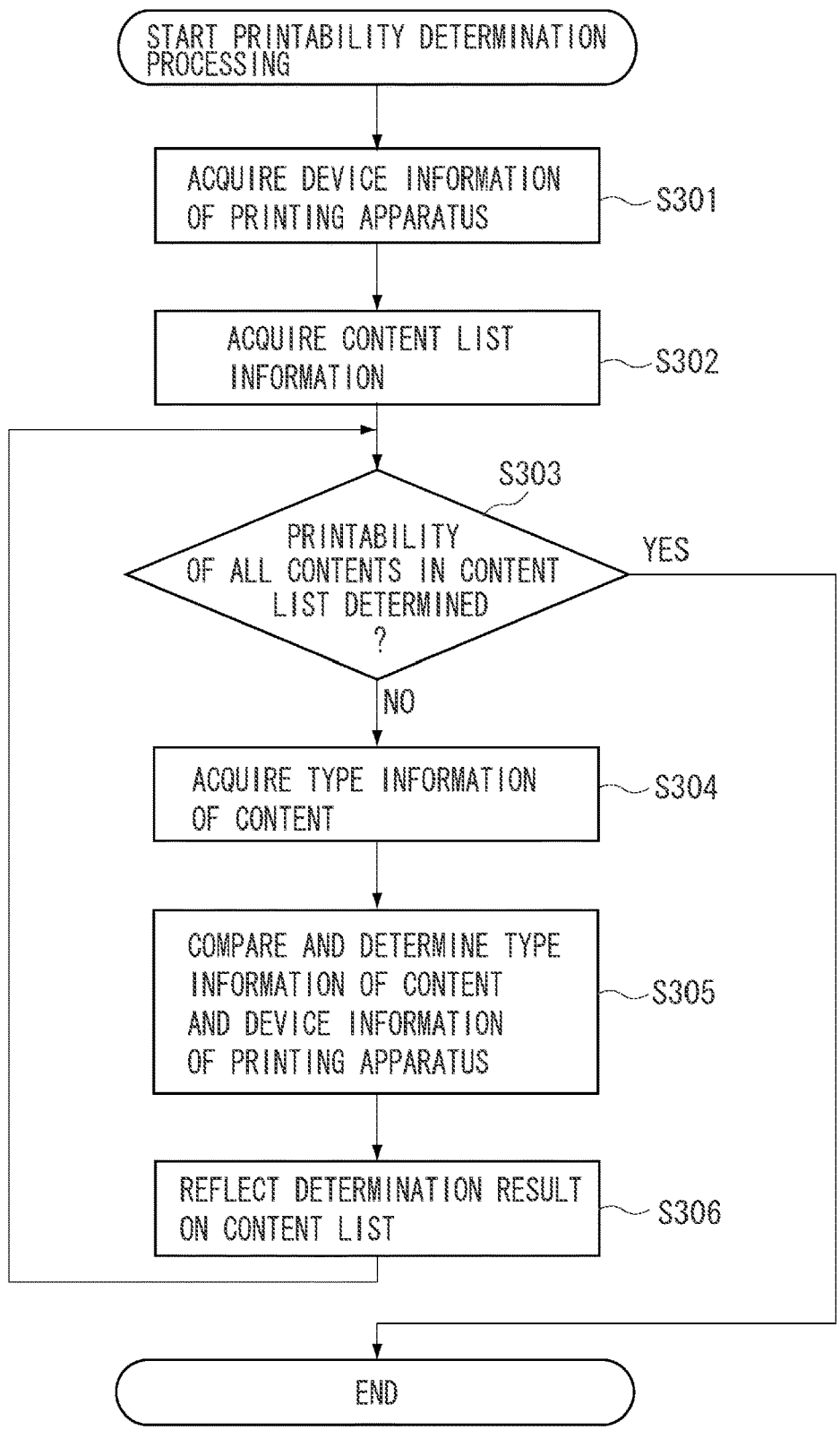
FIG. 3 is a flowchart illustrating details of printability determination processing in FIG. 2.

FIG. 3 is a flowchart illustrating the details of printability determination processing in step S203 in FIG. 2. In step S301, the printability determination unit 107 acquires device information of the printing apparatus 101 by the printing apparatus information acquisition unit 106. The device information is used for knowing the content printable by the printing apparatus 101. At this time, the printability determination unit 105 may acquire only information for identifying the devices, or may call up the device information preset on the image display control apparatus side, or may transfer all necessary information from the printing apparatus 101.

In step S302, the printability determination unit 107 acquires content list information displayed on the screen from the display control unit 110. The content list does not need to be aligned in a specific order, as long as information of all contents is included.

In step S303, the printability determination unit 107 checks whether printability of all contents in the content list has been determined. If determination of all contents has been completed (YES in step S303), printability determination processing is terminated, and the content list information to which printability determination result is added, is sent to the display switching unit 109. If a content about which determination has not been completed exists (NO in step S303), the processing proceeds to step S304.

In step S304, the printability determination unit 107 acquires type information of target content by the content type acquisition unit 108. Type information of the content includes such information as whether target content is printable content such as an image or a document, or whether target content is non-printable content such as an audio sound. In addition, if a print prohibition attribute is given to the content as additional attribute, it is acquired as a part of type information. As a method for acquiring a content type, the content type may be determined from an extension of the content as electronic data, or data format of file may be imported. In addition, the content type acquisition unit 108 has a correspondence table between extensions or data formats and content types to register them as type information.

In step S305, the printability determination unit 107 determines printability of the target content. At this time, the printability determination unit 107 compares and determines device information acquired in step S301 and type information of the content acquired in step S304. If the target content has type information which indicates printable obtained from the device information, and print prohibition attribute is not defined by the type information, then the target content is determined as printable. Not only a simple printability may be determined, but also, depending on a type of the content, whether the content is suitable for printing by the printing apparatus 101 may be determined.

In step S306, the printability determination unit 107 records a determination result of printability on the content list. At this time, not only the printability, but also, in case of non-printable, information indicating the reason for non-printable may be recorded. When the processing in step S306 is completed, the processing returns to step S303, and the processing is repeated until yet-to-be-processed content does not remain in the content list.

In the present exemplary embodiment, the printability determination processing is configured, when the printing apparatus 101 is brought close to or into contact with the display apparatus 111, to determine printability of the content in the printing apparatus 101 according to information about the printing apparatus 101 and information about the content displayed on the display apparatus 111. Therefore, whether the target content can be printed by the printing apparatus 101 a user wants to use, can be easily determined.

Based on a determination result of printability of the content in the printing apparatus 101, the display of the content is switched, so that the user can readily grasp the printability of the content.

Figure 4:
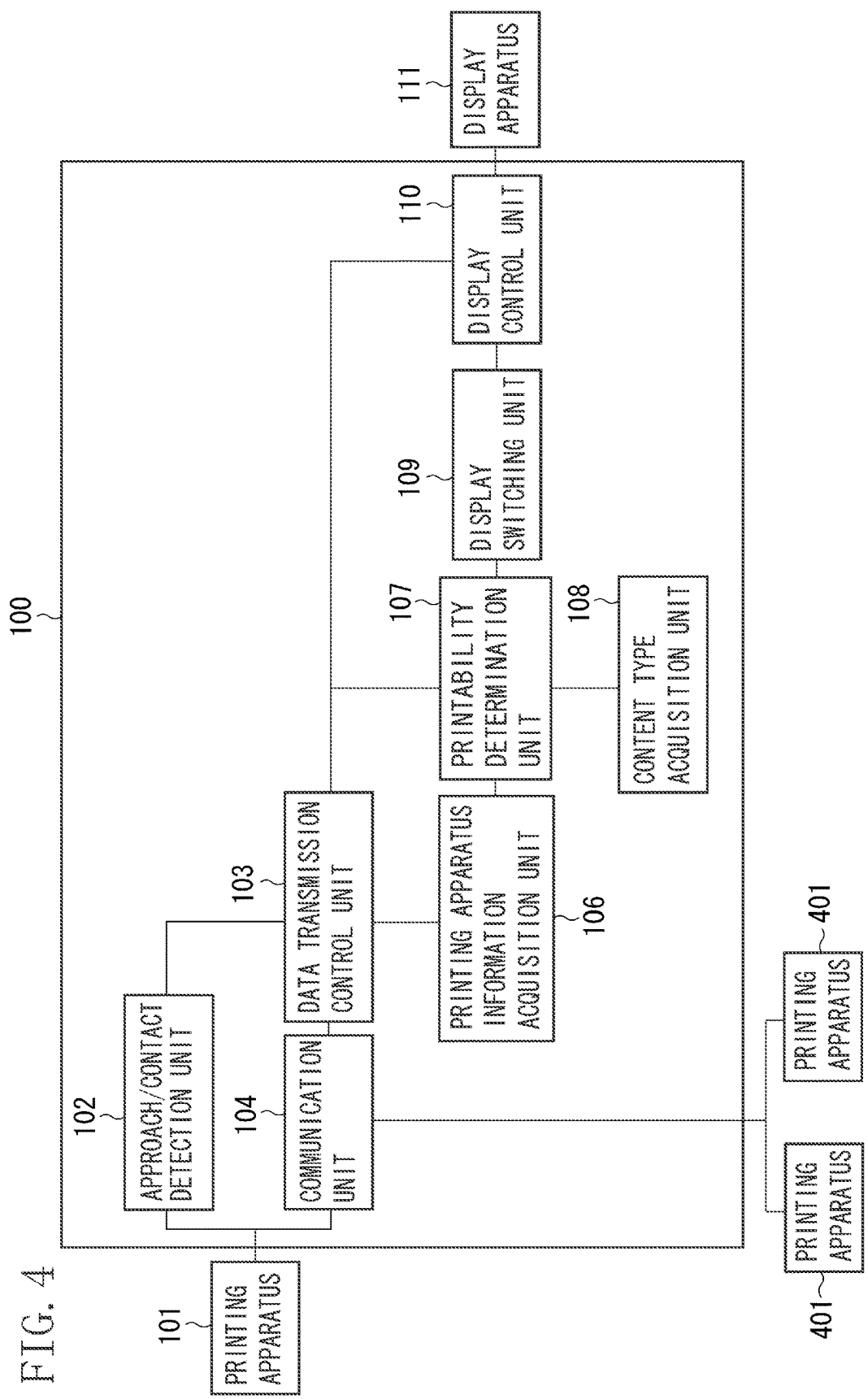
FIG. 4 is a block diagram illustrating a configuration of the principal components of an image display control apparatus according to a second exemplary embodiment of the present invention.

Next, a second exemplary embodiment of the present invention will be described. FIG. 4 is a block diagram illustrating a configuration of the principal components of the image display control apparatus 100 according to the second exemplary embodiment of the present invention. A point in the configuration illustrated in FIG. 4 which is different from the configuration illustrated in FIG. 1 is that in FIG. 4, external printing apparatuses 401 are newly added to the image display control apparatus 100. Other configuration is similar to respective units in FIG. 1, and thus descriptions thereof will be omitted.

In FIG. 4, the external printing apparatuses 401 are printing apparatuses connected to the image display control apparatus 100 via the communication unit 104 in advance, instead of the printing apparatus 101 which is brought close thereto by the user. The external printing apparatus 401 may be one set, or may be a plurality of sets.

Figure 5:
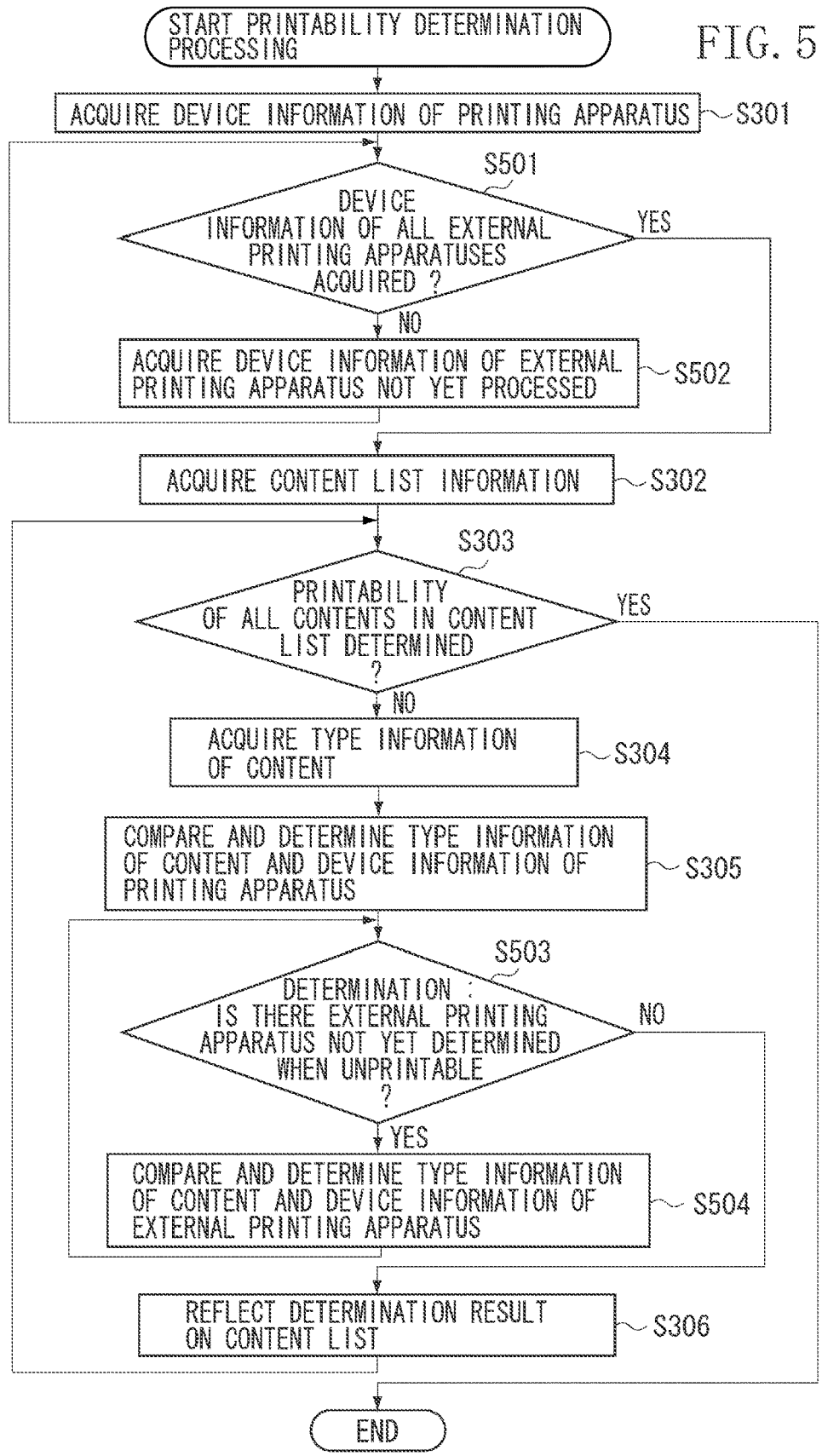
FIG. 5 is a flowchart illustrating printability determination processing in the second exemplary embodiment of the present invention.

FIG. 5 is a flowchart illustrating printability determination processing according to the second exemplary embodiment of the present invention. Overall processing is similar to the processing in the first exemplary embodiment illustrated in FIG. 2, and thus descriptions thereof will be omitted.

In step S501, the printability determination unit 107 determines whether device information acquisition processing has been performed on all of the external printing apparatuses 401. If the device information acquisition processing has been performed on all of the external printing apparatuses 401 (YES in step S501), the processing proceeds to step S302. If any external printing apparatus 401 which is yet to be processed still remains (NO in step S501), the processing transfers to step S502.

In step S502, the printability determination unit 105 acquires device information of the external printing apparatuses 401 yet to be processed by the printing apparatus information acquisition unit 106.

In step S503, if a printability determination result of the target content in the printing apparatus 101, which has been brought close thereto by the user, is non-printable, the printability determination unit 105 determines whether an external printing apparatus 401, in which printability determination has not yet been performed, exists. If a printability determination result of the target content is non-printable, and there exists an external printing apparatus 401, in which the printability determination has not yet been performed (YES in step S503), the processing transfers to step S504. In other case (NO in step S503), the printability determination result is non-printable, and the processing transfers to step S306.

In step S504, the printability determination unit 105 determines printability similarly to the processing in step S305. At this time, not the printing apparatus 101, but the external printing apparatuses 401 are comparison targets.

In printability determination in steps S305 and S504, if not only printability, but also suitability for printing in the target printing apparatus may be determined. In such a case, in step S503, if a determination result is non-printable or unsuitable for printing, the processing transfers to step S504.

Other steps are similar to the processing illustrated in FIG. 3 in the first exemplary embodiment, and thus descriptions thereof will be omitted.

Figure 6:
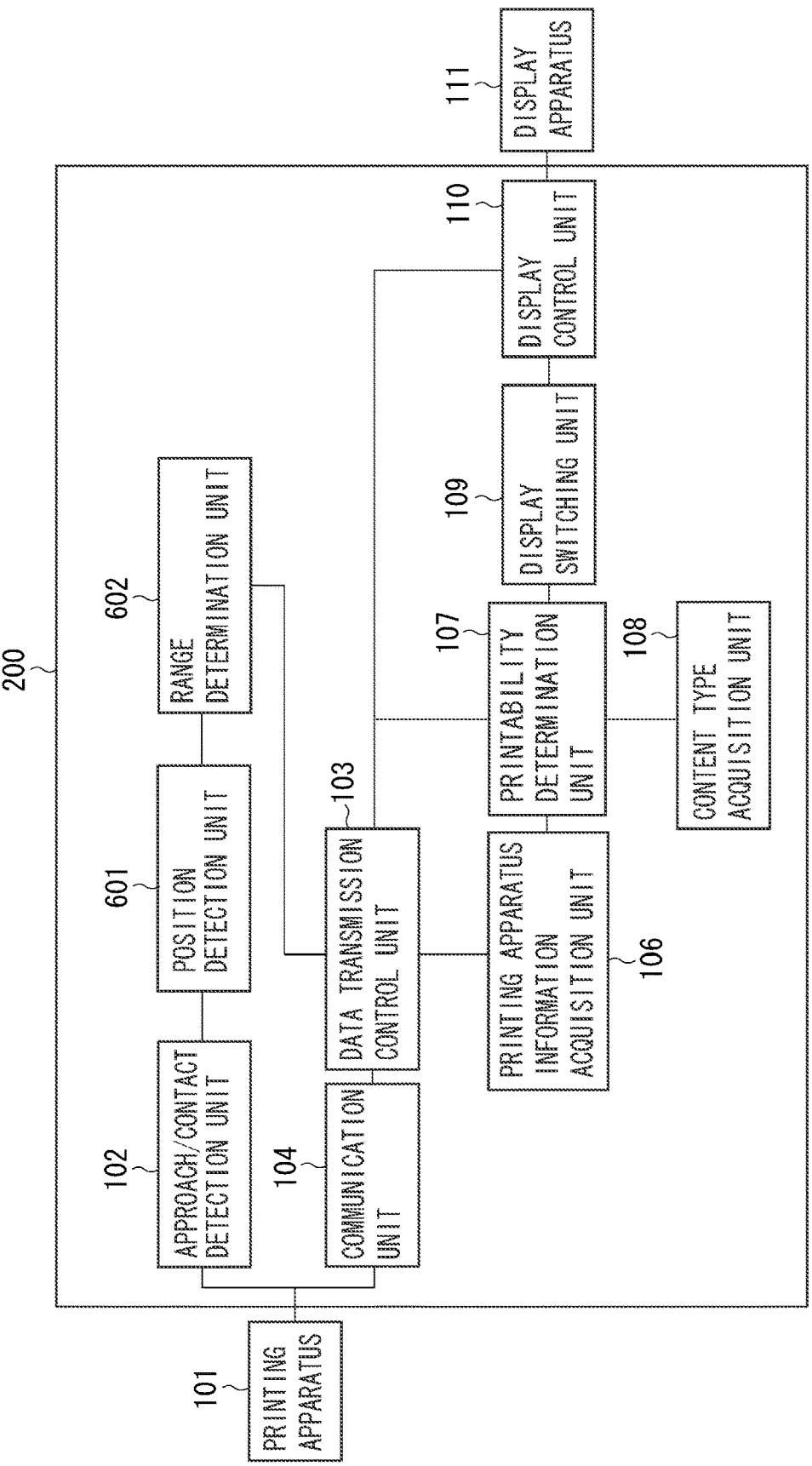
FIG. 6 is a block diagram illustrating a configuration of the principal components of an image display control apparatus according to a third exemplary embodiment of the present invention.

Next, a third exemplary embodiment of the present invention will be described. FIG. 6 is a block diagram illustrating a configuration of the principal components of an image display control apparatus 200 according to the third exemplary embodiment of the present invention. A point in the configuration illustrated in FIG. 6 which is different from the configuration illustrated in FIG. 1 is that, in FIG. 6, a position detection unit 601 and a range setting unit 602 are newly added to the image display control apparatus 100 in FIG. 1. Other configuration is similar to respective units in FIG. 1, and thus descriptions thereof will be omitted.

In FIG. 6, when the approach/contact detection unit 102 detects the printing apparatus 101, the position detection unit 601 acquires coordinate information indicating a position of the display apparatus 111 at which the printing apparatus 101 has come close to or into contact with the display apparatus 111. The position detection unit 601 is an application example of a detection unit according to the present invention.

The range setting unit 602 sets a processing range on the display apparatus 111 based on the coordinate information. As the processing range, arbitrary shape such as predefined circle or polygon can be set around coordinate information. A size of the processing range may be designated in advance, or may be calculated using a distance between the printing apparatus 101 and the display apparatus 111 acquired by the approach/contact detection unit 102. The set processing range is sent to the data transmission control unit 103, and is utilized to limit target contents when the target content list for the printability determination is created. The range setting unit 602 is an application example of a setting unit according to the present invention.

Figure 7:
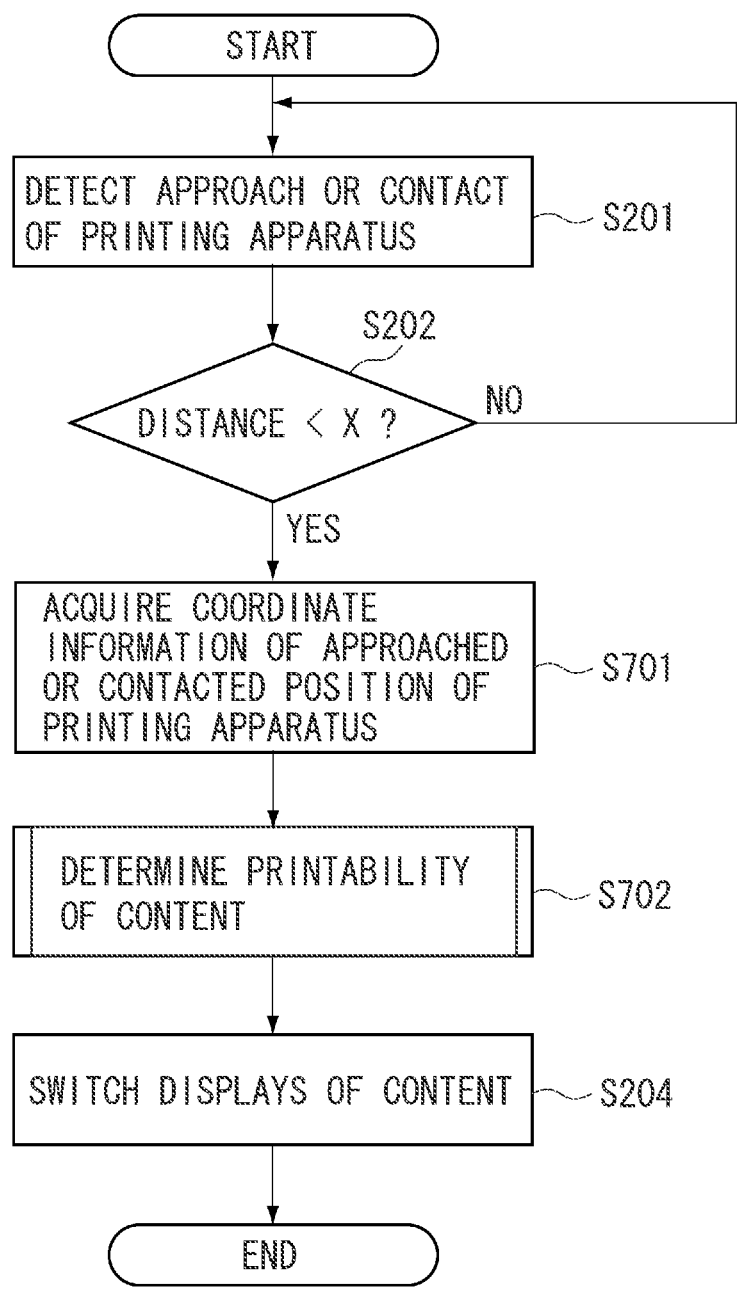
FIG. 7 is a flowchart illustrating general processing of the image display control apparatus according to the third exemplary embodiment of the present invention.

FIG. 7 is a flowchart illustrating general processing of an image display control apparatus 200 according to the present exemplary embodiment. In step S701, the position detection unit 601 acquires coordinate information of a position at which the printing apparatus 101 has come close to or into contact with the display apparatus 111, and sends it to the range setting unit 602. The step S702 has the same name as step S203 in FIG. 2, but internal processing is different from each other. A processing content in step S702 will be described below. In addition, other processing steps are similar to steps in FIG. 3 in the first exemplary embodiment, and thus descriptions thereof will be omitted.

Figure 8:
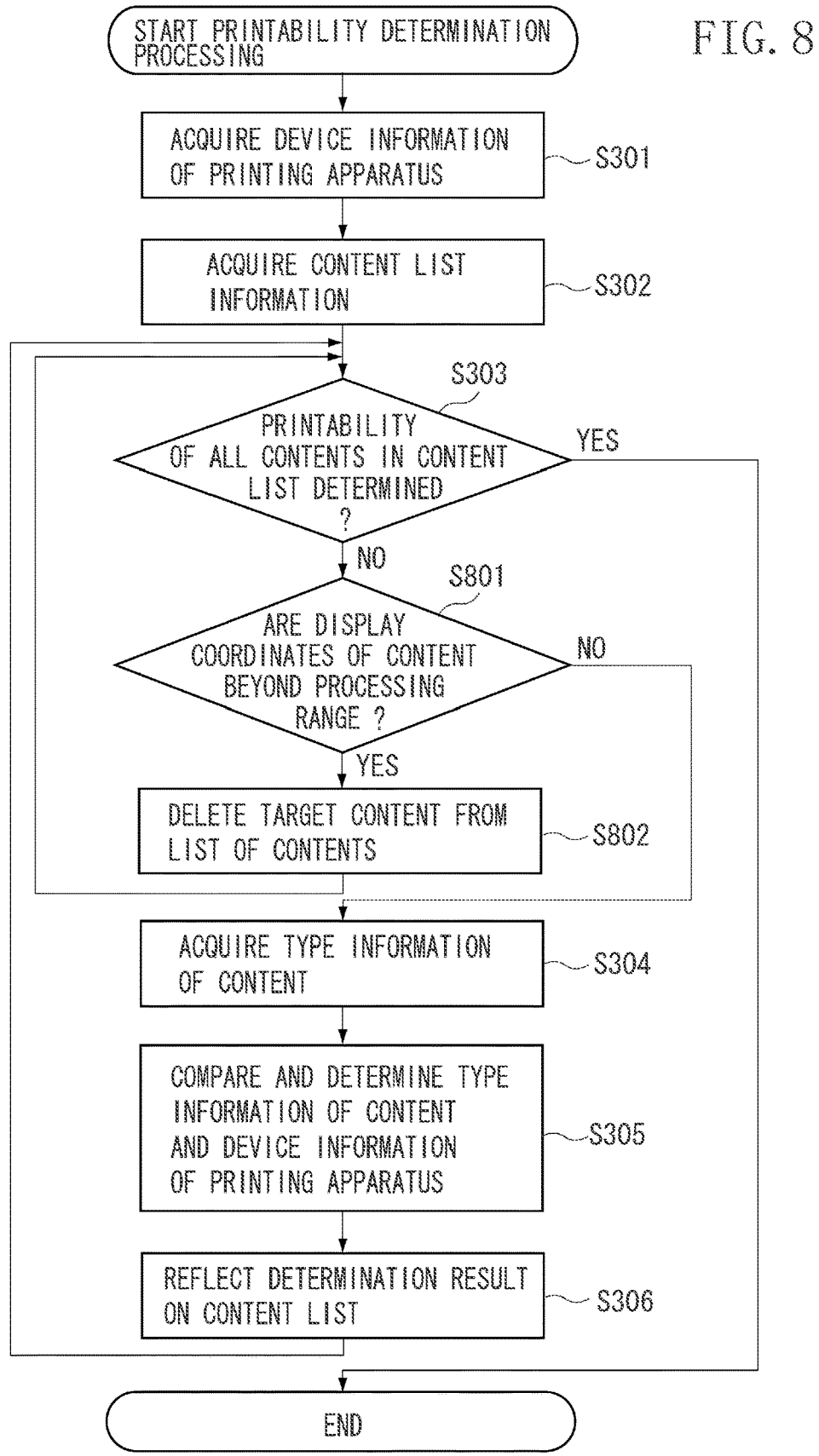
FIG. 8 is a flowchart illustrating details of printability determination processing in FIG. 7.

FIG. 8 is a flowchart illustrating details of the printability determination processing in step S702 in FIG. 7. In step S801, the printability determination unit 105 calculates whether a display position of the target content lies beyond the processing range using coordinate information. Assume that the processing range is set by, for example, a circle with a radius "r". At this time, if a distance between a position coordinate, which the printing apparatus 101 has come close to or into contact with, and a display position coordinate of the target content, is larger than the radius "r", the display position of the target content lies beyond the set processing range. On the other hand, if a distance of the display position coordinate of the target content is equal to or smaller than the radius "r", the display position of the target content lies within the processing range being set.

In step S802, the printability determination unit 105 deletes information of the target content determined as beyond the processing range (YES in step S801) from the list of contents, and the processing returns to step S303. On the other hand, a content which has been determined as within the processing range (NO in step S801), the printability determination unit 105 transfers to the processing that starts from acquisition processing of type information in step S304. Other processing steps are similar to those in FIG. 3 in the first exemplary embodiment, descriptions thereof will be omitted.

Figure 9:
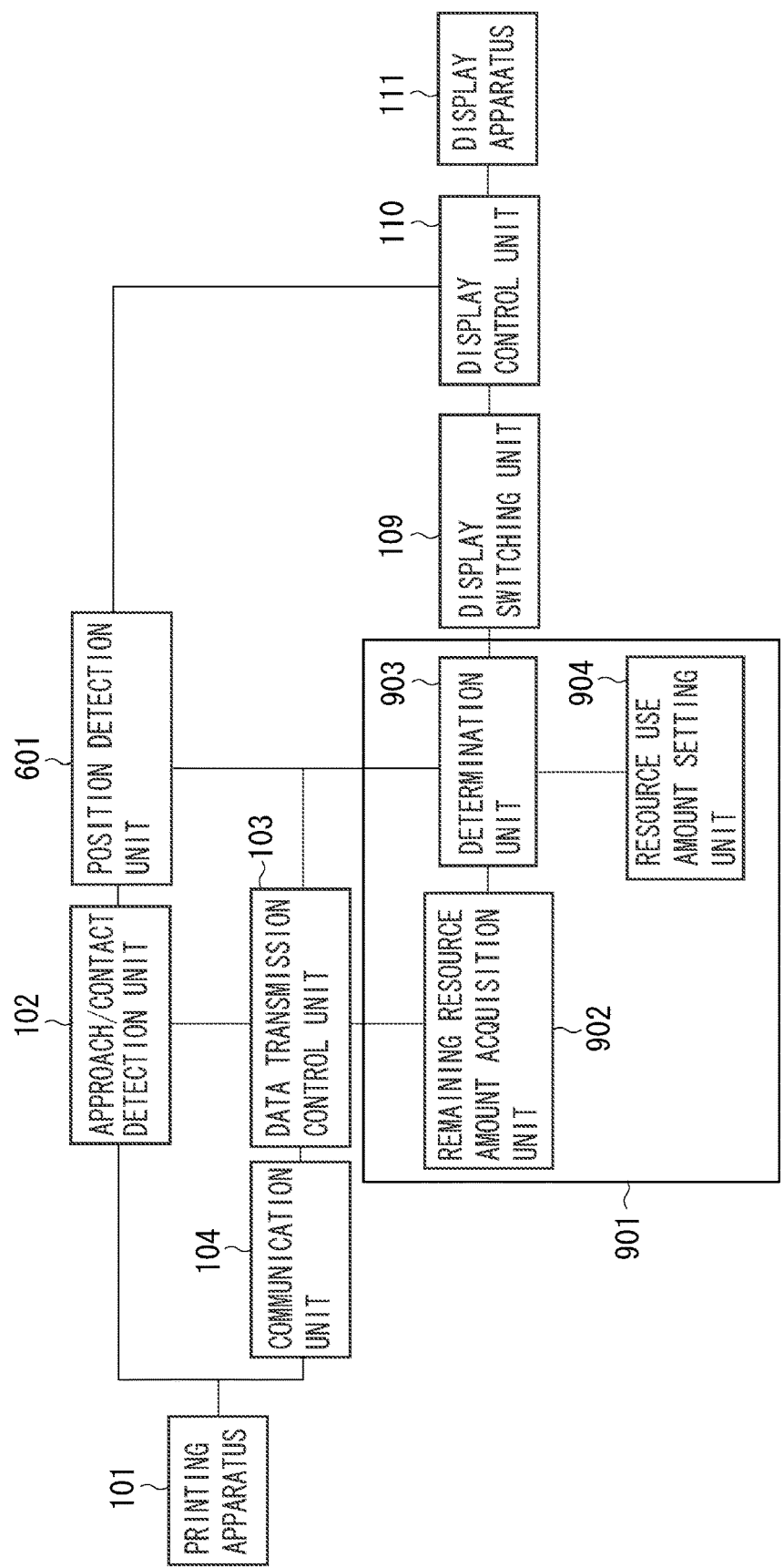
FIG. 9 is a block diagram illustrating a configuration of the principal components of an image display control apparatus according to a fourth exemplary embodiment.

FIG. 9 is a block diagram illustrating a configuration of the principal components of an image display control apparatus according to a fourth exemplary embodiment of the present invention. In FIG. 9, a printing apparatus 101 would be more preferably a portable, compact printer. A display apparatus 111 is separately illustrated in FIG. 9, but is configured to include respective units as described below.

In the display apparatus 111, a content such as a photo displayed on a screen thereof can be manipulated, for example, by changing a size of the photo, or moving the photo by the user lightly touching it with fingers. In addition, as will be described in detail below, by bringing the printing apparatus 101 close to the screen of the display apparatus 111, the printing apparatus 101 can print a content displayed on the screen of the display apparatus 111.

An approach/contact detection unit 102 detects approach or contact of the printing apparatus 101 when it comes close to or into contact with the screen of the display apparatus 111. The approach/contact detection unit 102, upon detecting the approach or contact of the printing apparatus 101, establishes connection to the printing apparatus 101 via the communication unit 104. At this time, the connection to the printing apparatus 101 is performed using publicly known wireless communication technique.

A position detection unit 601, upon receiving a notice of approach/contact from the detection unit 102, detects approach or contact position of the printing apparatus 101. The position detection unit 601 is connected to a display control unit 110, and receives coordinate information on the screen of the display apparatus 111.

A communication unit 104 wirelessly communicates with the printing apparatus 101. A data transmission control unit 103, if approach or contact of the printing apparatus 101 is detected by the approach/contact detection unit 102, transmits content data determined as printable by the printability determination unit 901 to the printing apparatus 101 via the communication unit 104.

A printability determination unit 901 determines whether a content displayed on the screen of the display apparatus 111 is printable. In the printability determination unit 901, a remaining resource amount acquisition unit 902 acquires a remaining resource amount of the printing apparatus 101, that is, remaining amount information of, for example, color materials or print sheets. A resource use amount setting unit 904 sets a resource amount to be used during printing operation of a content displayed on the screen of the display apparatus 111 to a value defined in advance based on kind and volume of the content. The determination unit 903 compares values obtained by the remaining resource amount acquisition unit 902 and the resource use amount setting unit 904, and determines whether the content displayed on the screen of the display apparatus 111 is printable. At this time, contents are determined in an increasing order from the shortest distance from a position of the printing apparatus 101 detected by the position detection unit 103.

A display switching unit 109 switches displays of contents in order to distinguish the content determined by the printability determination unit 901. In switching the displays of contents, a printable content may be conspicuously displayed, the display of a non-printable content may be changed to dark, or the both may be displayed. The conspicuous display may be a highlight display, a flashing display, a high-brightness display, an enlargement display, or may be a shadow display looking like floating. If a printable content underlaps non-printable content, its display position is moved and the content in question may be displayed on the front.

A display control unit 110 displays a content on the screen of the display apparatus 111. The display control unit 110 is connected to the position detection unit 601, which receives coordinate information on the screen of the display apparatus 111 from the display control unit.

Figure 10:
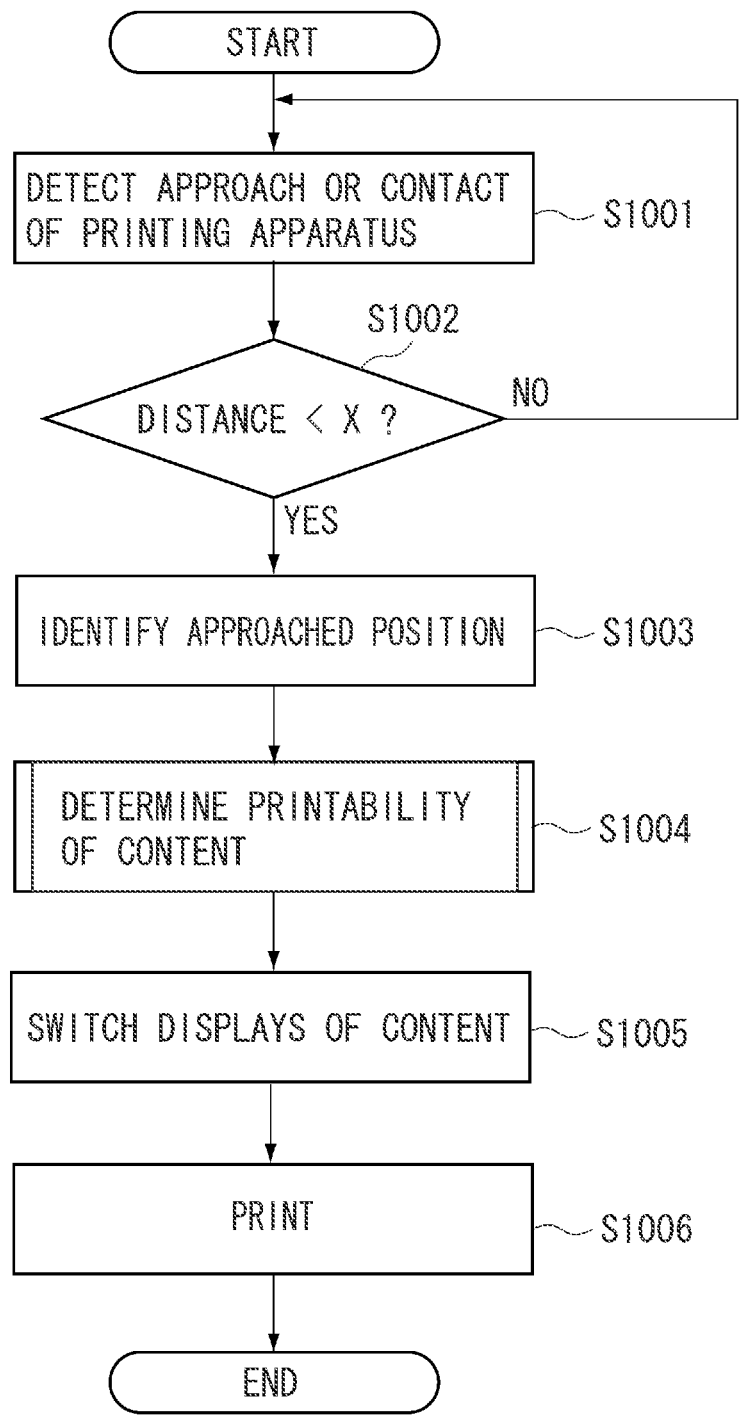
FIG. 10 is a flowchart illustrating print processing in the image display control apparatus according to the fourth exemplary embodiment.

FIG. 10 is a flowchart illustrating print processing in the image display control apparatus according to the present exemplary embodiment. In steps S1001 and S1002, the approach/contact detection unit 102 detects approach or contact of the printing apparatus 101. The approach/contact detection unit 102 checks a distance between the screen of the display apparatus 111 and the printing apparatus 101 as needed. If the distance is less than "X" (YES in step S1002), it is determined that the printing apparatus 101 has approached or contacted.

In step S1002, if approach or contact of the printing apparatus 101 has been detected (YES in step S1002), then in step S1003, the position detection unit 601 acquires coordinate information of the printing apparatus 101 on the screen of the display apparatus 111 from the display control unit 110. In step S1004, the determination unit 903 determines printability of a content displayed on the screen of the display apparatus 111. The processing in step S1004 will be described below.

In step S1005, the display switching unit 109 switches displays of contents in order to distinguish whether a content determined in step S1004 is printable. The switching of displays is as previously described in the explanation of FIG. 9.

In step S1006, the data transmission control unit 103 sends the content data determined as printable by the printability determination unit 901 to the printing apparatus 101 via the communication unit 104. The printing apparatus 101 prints the content data sent by the data transmission control unit 103.

Figure 11:
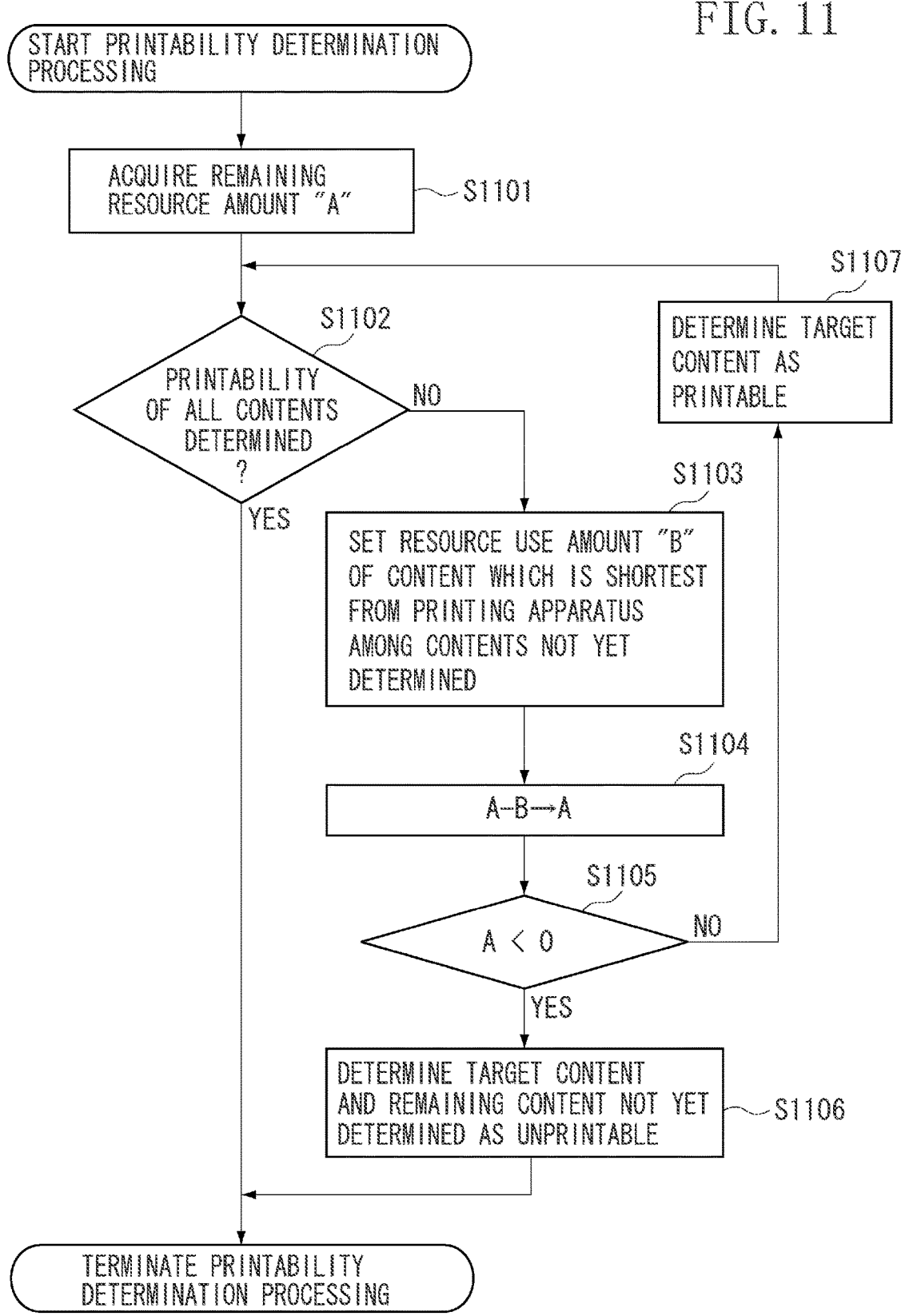
FIG. 11 is a flowchart illustrating printability determination processing.

FIG. 11 is a flowchart illustrating printability determination processing in step S1004. In step S1101, the printability determination unit 901 acquires a remaining resource amount "A" of the printing apparatus 101 by the remaining resource amount acquisition unit 902. The remaining resource amount "A" may be a remaining amount of color materials, or may be a remaining amount of print sheets, or may be the both. The data transmission control unit 103 receives a request from the remaining resource amount acquisition unit 902, acquires the remaining resource amount of the printing apparatus 101 via the communication unit 104, and notifies the remaining resource amount acquisition unit 902 of the acquired information.

In steps S1102 to S1107, the printability determination unit 901 determines printability of all contents displayed on the screen of the display apparatus 111. In step S1102, the printability determination unit 901 checks whether printability of all contents has been determined. If determinations of all contents have been completed (YES in step S1102), the printability determination processing is terminated. If contents on which determination have not been completed exist (NO in step S1102), then the processing proceeds to step S1103.

In step S1103, the printability determination unit 901 sets a resource use amount "B", which is used when a content is printed, by a resource use amount setting unit 904. At this time, the resource use amount setting unit 904 sets the resource use amount of the content which shows shortest distance from the printing apparatus 101 among contents about which determinations have not yet been completed by the determination unit 903. In this process, the resource use amount "B" is a resource use amount corresponding to the remaining resource amount "A", and the resource use amount "B" is set to a value determined in advance depending on kind and volume of the content.

In steps S1104 and S1105, it is determined whether the resource use amount "B" set in step S1103 is within a range of the remaining resource amount "A" of the printing apparatus 101. First, in step S1104, the determination unit 903 determines a difference between the remaining resource amount "A" and the resource use amount "B", and newly sets the result (A-B) to the remaining resource amount "A". Next in step S1105, if the remaining resource amount "A" newly set in step S1104 has a negative value (YES in step S1105), the processing proceeds to step S1106. If it has a zero or greater value (NO in step S1105), the processing proceeds to step S1107.

In step S1106, the printability determination unit 901 determines as non-printable a content for which the remaining resource amount "A" is newly set to be a negative value in step S1105 and all remaining contents on which determination of printability has not been completed, and then the printability determination processing is terminated.

On the other hand, in step S1107, the printability determination unit 901 determines as printable a content for which the remaining resource amount "A" is newly set to be a zero or greater value in step S1105, and the processing returns to step S1102. In step S1107, in order to differentiate (to enable distinguishing) from a content which has been determined as non-printable, a content determined as printable may be moved to the vicinity of the printing apparatus 101.

As described above, whether the target content is printable by the printing apparatus 101 can be checked by a simple operation of bringing the printing apparatus 101 close to or into contact with the screen of the display apparatus 111.

Figure 12:
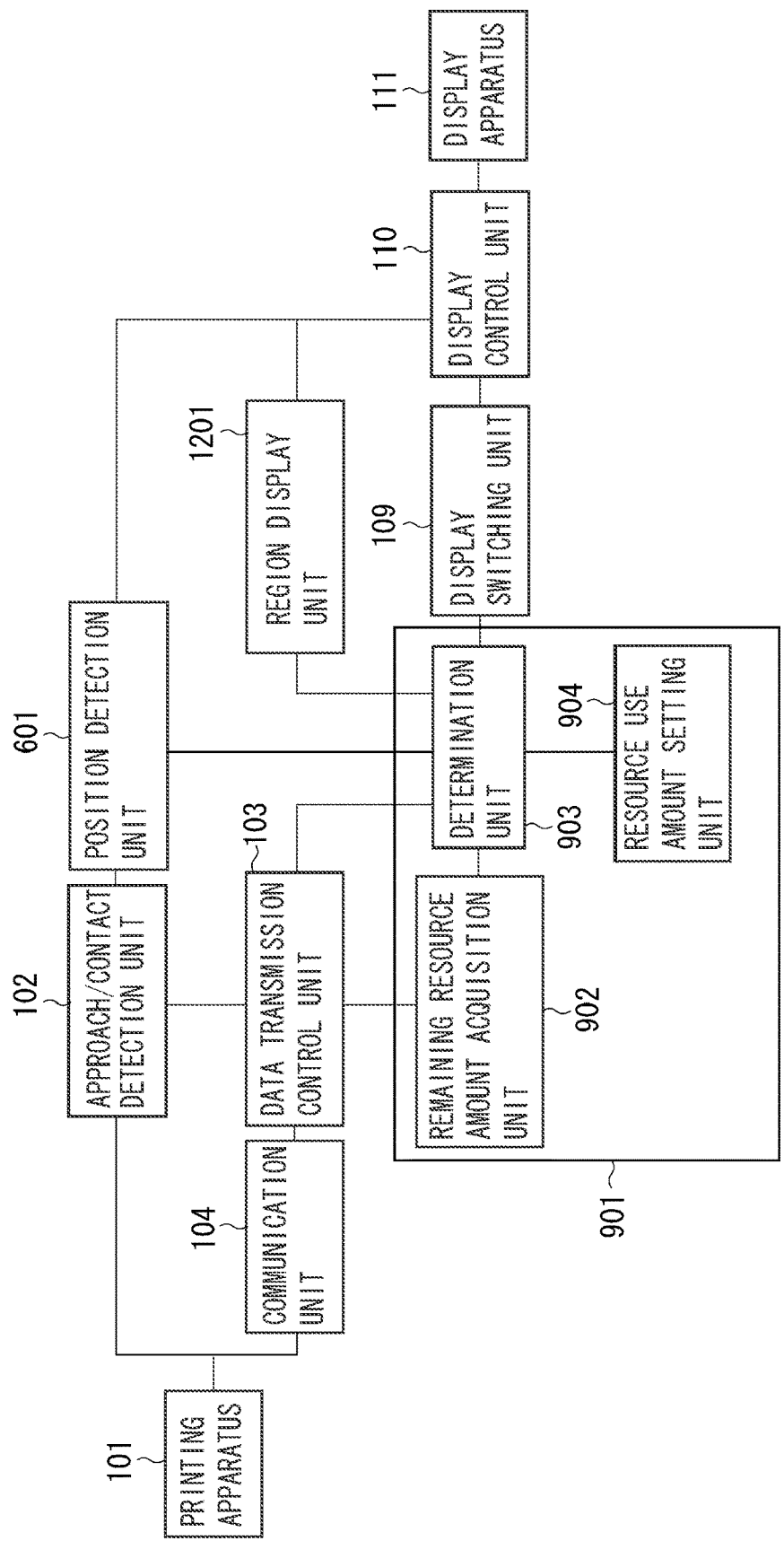
FIG. 12 is a block diagram illustrating a configuration of the principal components of an image display control apparatus according to a fifth exemplary embodiment.

FIG. 12 is a block diagram illustrating a configuration of the principal components of an image display control apparatus according to a fifth exemplary embodiment of the present invention. A different point from the configuration in FIG. 9 is that a region display unit 1201 is newly added. Other components are similar to respective components in FIG. 9, and thus descriptions thereof will be omitted.

The region display unit 1201 displays a region around a position of the printing apparatus 101, for example, a circular region on the screen of the display apparatus 111, based on positional information of the printing apparatus 101 obtained from the position detection unit 601. Only contents existing within the region will become determination target for printability by the printability determination unit 901.

Figure 13:
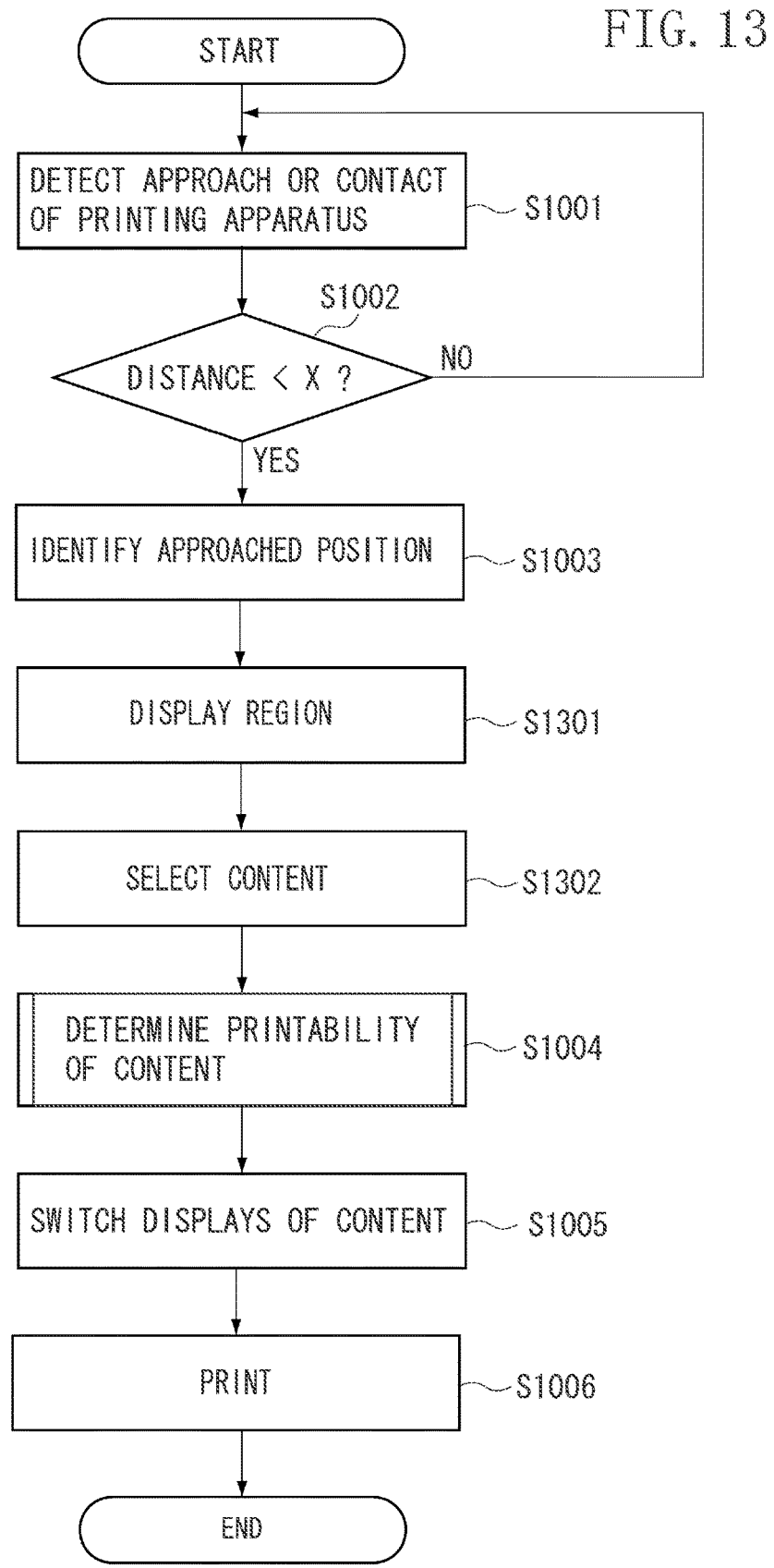
FIG. 13 is a flowchart illustrating print processing in the image display control apparatus according to the fifth exemplary embodiment.

FIG. 13 is a flowchart illustrating print processing in the image display control apparatus according to the present exemplary embodiment. A different point from the flowchart in FIG. 10 is that steps S1301 and S1302 are newly added. Other steps are similar to respective steps in FIG. 10, and thus descriptions thereof will be omitted.

In step S1301, the region display unit 1201 acquires positional information of the printing apparatus 101 from the position detection unit 601, and displays a region around a position of the printing apparatus 101, for example, a circular region on the screen of the display apparatus 111.

In step S1302, the printability determination unit 901 sets a content within the region displayed in step S1301 as printability determination target. Subsequently in step S1004, the printability determination unit 901 determines printability of the content set in step S1302.

Figure 14:
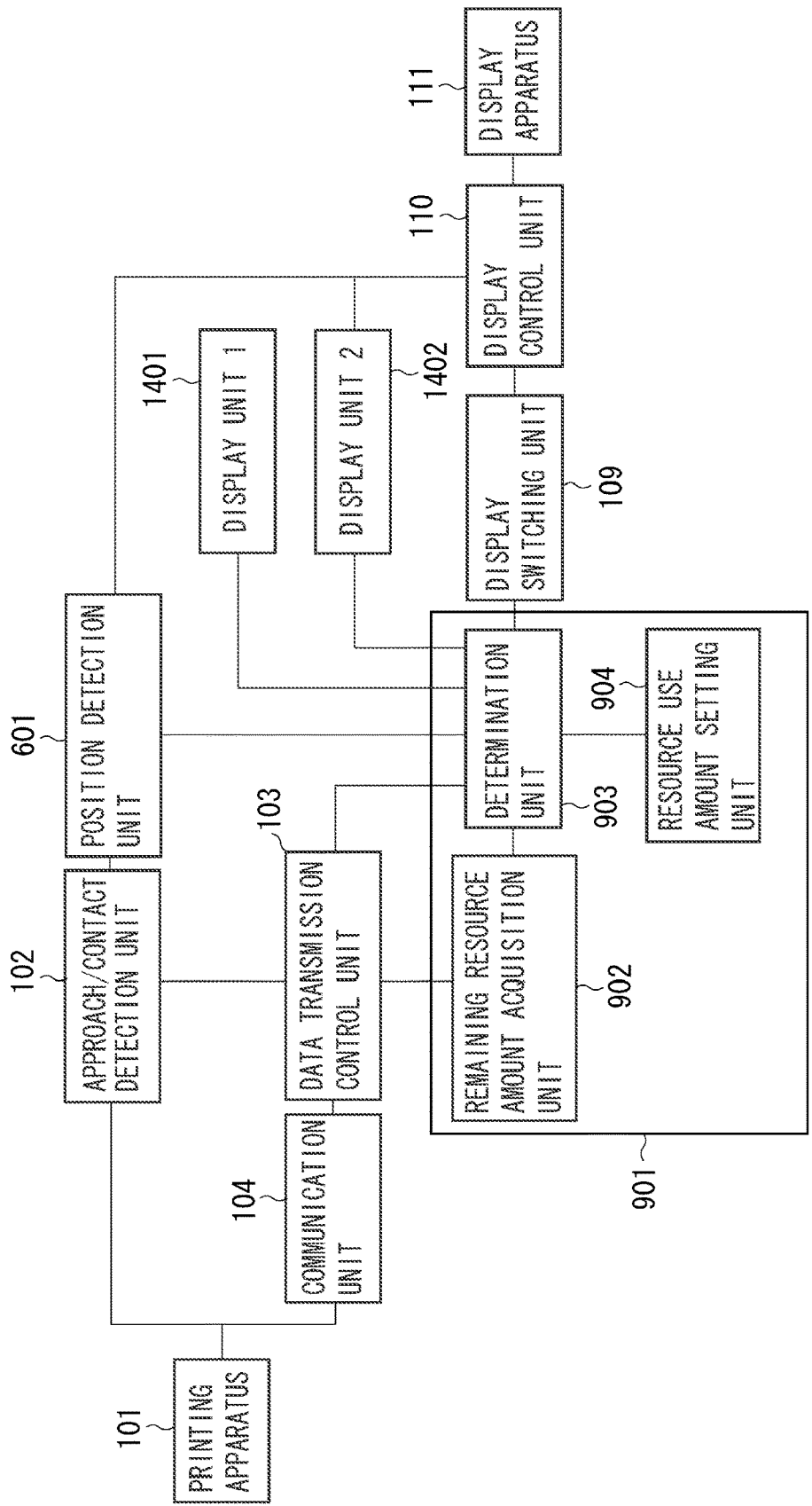
FIG. 14 is a block diagram illustrating a configuration of the principal components of an image display control apparatus according to a sixth exemplary embodiment.

FIG. 14 is a block diagram illustrating a configuration of the principal components of an image display control apparatus according to a sixth exemplary embodiment of the present invention. A different point from the configuration FIG. 9 is that a first display unit 1401 and a second display unit 1402 are newly added. Other components are similar to respective components in FIG. 9, and thus descriptions thereof will be omitted.

The first display unit 1401 displays a region around a position of the printing apparatus 101, for example, a circular region, on the screen of the display apparatus 111, based on positional information of the printing apparatus 101 obtained from the position detection unit 601, and displays a remaining resource amount of the printing apparatus 101 within the region. The remaining resource amount may be displayed in the close vicinity of the position of the printing apparatus 101.

The second display unit 1402 acquires from the display control unit 110 positional information of a content determined as non-printable by the printability determination unit 901, and displays a region the content in question, for example, a circular region, on the screen of the display apparatus 111, and displays a region with respect to a resource use amount of the content in question. The resource use amount may be displayed in the close vicinity of the content in question. Alternatively, the second display unit 1402 may acquire from the display control unit 110 positional information of a content which is expected to show deterioration of image quality in printing, out of contents determined as printable by the printability determination unit 901, and may display a region, for example, a circular region around the content in question on the screen of the display apparatus 111, or a resource use amount of the content in question may be displayed. The resource-for-use amount may be displayed in the close vicinity of the content in question. In this case, cause of the image quality deterioration may be displayed in the close vicinity of the content in question as a message.

Also in the present exemplary embodiment, a region display unit 1201 is provided similarly to the fifth exemplary embodiment, and a determination target for printability may be a content within the region.

Figure 15:
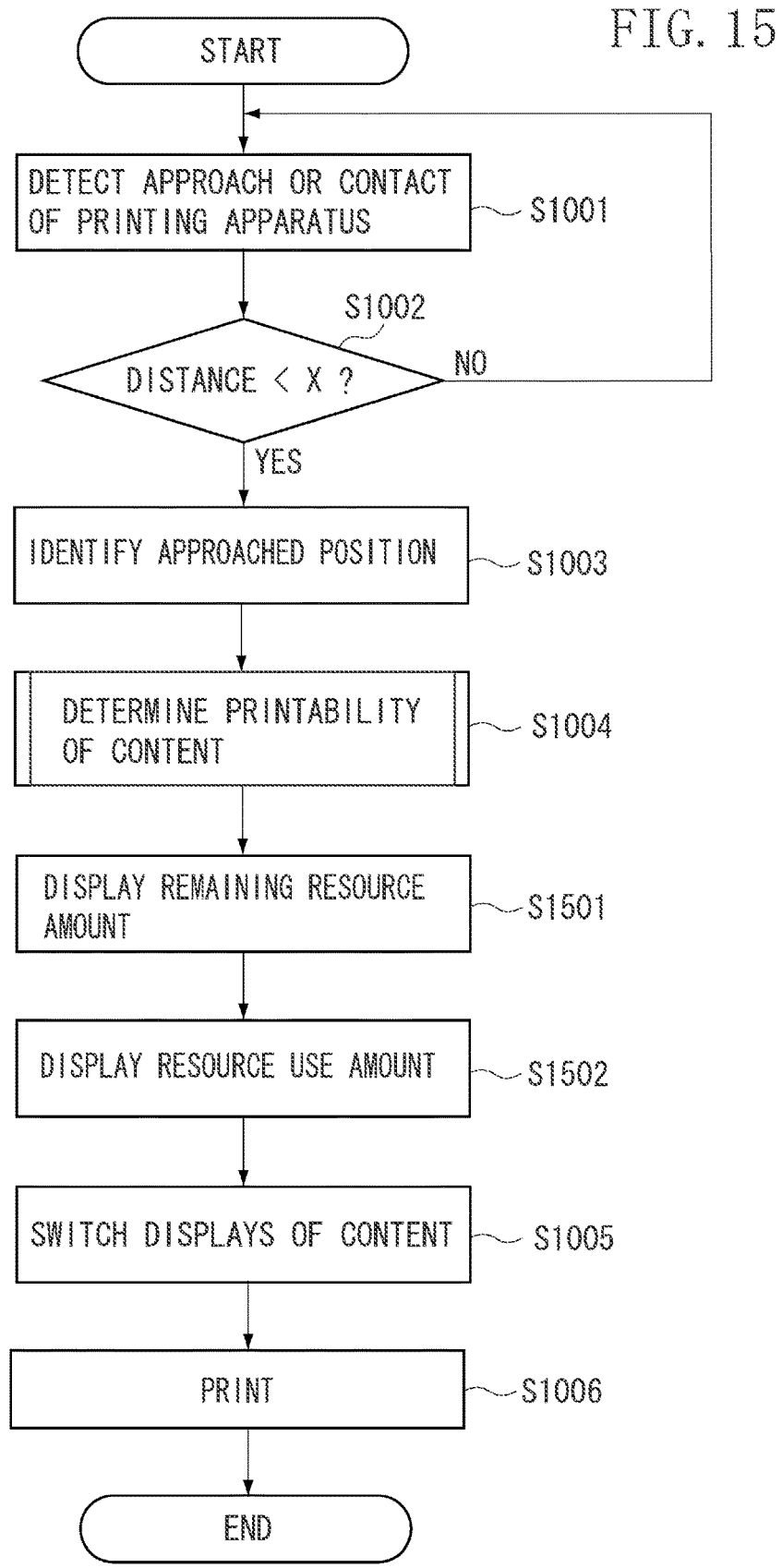
FIG. 15 is a flowchart illustrating print processing of the image display control apparatus according to the sixth exemplary embodiment.

FIG. 15 is a flowchart illustrating print processing in the image display control apparatus according to the present exemplary embodiment. A different point from the flowchart in FIG. 10 is that steps S1501 and S1502 are newly added. Other steps are similar to respective steps in FIG. 10, and thus descriptions thereof will be omitted.

In step S1501, the first display unit 1401 acquires positional information of the printing apparatus 101 from the position detection unit 601. The first display unit 1401 displays a region around the printing apparatus 101, for example, a circular region, on the screen of the display apparatus 111, based on the acquired positional information, and displays a remaining resource amount of the printing apparatus 101. An area of the region is changed depending on the remaining resource amount, and the more the remaining amount, the larger the area becomes. As stated previously, the region may be displayed in the close vicinity of the position of the printing apparatus 101.

In step S1502, the second display unit 1402 acquires positional information of a content which will be a target, from the display control unit 110. The second display unit 1402 displays a region around the content in question, for example, a circular region, on the screen of the display apparatus 111, based on the acquired positional information, and displays a resource use amount of the content in question. An area of the region is changed depending on the resource use amount, namely, the more the use amount, the lager becomes. As stated previously, the region may be displayed in the close vicinity of the content in question. The content which becomes a target may be a content determined as printable by the printability determination unit 901, or it may be a content determined as non-printable. If a content determined as printable becomes a target, the content may be targeted which by reason of, for example, insufficient remaining amount of color material of a certain color, is expected to show deterioration of image quality during printing operation. Moreover, if a content which is expected to show a deterioration of the image quality becomes a target, cause for the image quality deterioration may be displayed in the close vicinity of the content in question as a message, in place of the resource use amount.

Figure 16:
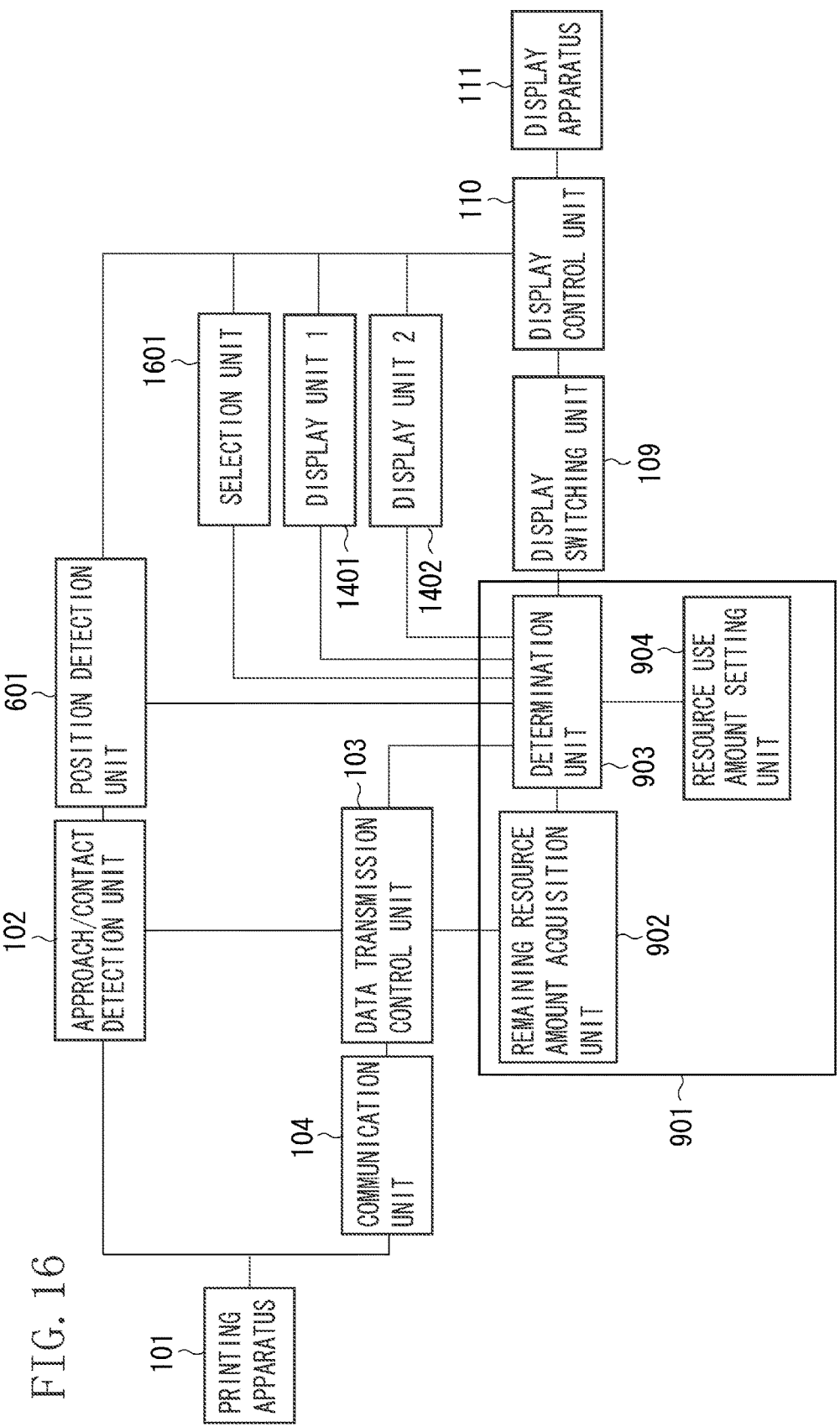
FIG. 16 is a block diagram illustrating a configuration of the principal components of an image display control apparatus according to a seventh exemplary embodiment.

FIG. 16 is a block diagram illustrating a configuration of the principal components of an image display control apparatus according to a seventh exemplary embodiment of the present invention. A different point from the configuration in FIG. 14 is that a selection unit 1601 is newly added. Other components are similar to respective components in FIG. 14, and thus descriptions thereof will be omitted.

The selection unit 1601 takes a content selected by a user as a determination target for printability.

Figure 17:
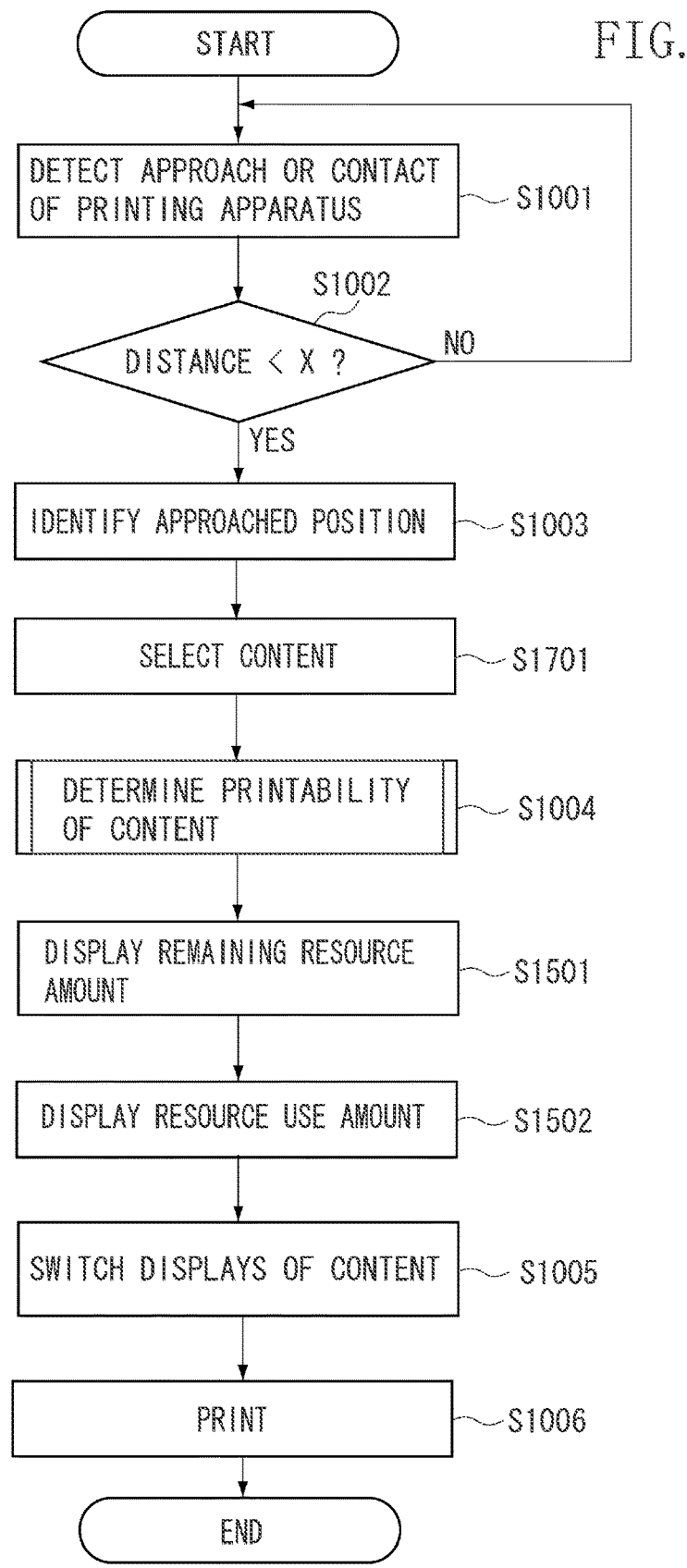
FIG. 17 is a flowchart illustrating print processing of the image display control apparatus according to the seventh exemplary embodiment.

FIG. 17 is a flowchart illustrating print processing in the image display control apparatus according to the present exemplary embodiment. A different point from the flowchart in FIG. 15 is that step S1701 is newly added. Other steps are similar to respective steps in FIG. 15, and descriptions thereof will be omitted.

In step S1701, the selection unit 1601 takes a content selected by the user as a determination target for printability in step S1004.

The configurations given in the foregoing exemplary embodiments are only an example, and the present invention is not limited to the illustrated configurations. More specifically, the exemplary embodiments of the present invention may be applied to a part of a system including a plurality of devices, or to a part of an apparatus including a single device.

Other Embodiments

The present invention can be also realized by supplying a software (program) for realizing the above-described functions of the exemplary embodiments, via a network or various types of storage media to a system or apparatus, and causing a computer (or e.g., central processing unit (CPU) or micro processing (MPU)) of the system or apparatus to read out and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:
1. A display control apparatus, comprising:
at least one processer; and
a memory, wherein the at least one processer executes instructions stored in the memory to thereby cause following units to function:
- a display control unit configured to display content on a display screen; and
- a detection unit configured to detect approach or contact between a wireless device and the display control apparatus, wherein the display control unit performs predetermined display on a basis of information acquired via wireless communication from the wireless device in a case where the approach or contact between the wireless device and the display control apparatus is detected by the detection unit while predetermined content is displayed on the display screen, and does not perform the predetermined display in a case where the approach or contact between the wireless device and the display control apparatus is detected by the detection unit while the predetermined content is not displayed on the display screen.

2. The display control apparatus according to claim 1, wherein the information acquired from the wireless device is device-specific information or information about a function that the wireless device has.

3. The display control apparatus according to claim 1, wherein the information acquired from the wireless device is serial number or model number.

4. The display control apparatus according to claim 1, wherein the wireless device is a printing apparatus, and the content is data to be printed.

5. The display control apparatus according to claim 4, wherein the display control unit displays whether the content displayed on the display screen is printable or not on a basis of the information acquired via wireless communication from the wireless device.

6. The display control apparatus according to claim 1, wherein the detection unit checks a distance between the display control apparatus and the wireless device, and detects the approach or contact if it is determined that the distance is less than a predetermined distance value.

7. The display control apparatus according to claim 1, further comprising:
a selection unit configured to select content;
wherein the display control unit performs display corresponding to the content selected by the selection unit on a basis of the information acquired via wireless communication from the wireless device in a case where the approach or contact of the wireless device is detected by the detection unit.

8. A display method implemented by a display control apparatus, comprising:

detecting approach or contact between a wireless device and the display control apparatus, wherein the display control unit performs predetermined display on a basis of information acquired via wireless communication from the wireless device in a case where the approach or contact between the wireless device and the display control apparatus is detected by the detection unit while predetermined content is displayed on a display screen, and does not perform the predetermined display in a case where the approach or contact between the wireless device and the display control apparatus is detected by the detection unit while the predetermined content is not displayed on the display screen.

9. A non-transitory computer-readable storage medium storing a program that causes a display control apparatus to implement a display method, comprising:

detecting approach or contact between a wireless device and the display control apparatus, wherein the display control unit performs predetermined display on a basis of information acquired via wireless communication from the wireless device in a case where the approach or contact between the wireless device and the display control apparatus is detected by the detection unit while predetermined content is displayed on a display screen, and does not perform the predetermined display in a case where the approach or contact between the wireless device and the display control apparatus is detected by the detection unit while the predetermined content is not displayed on the display screen.

* * * * *